(12) United States Patent
Ito et al.

(10) Patent No.: US 10,361,545 B2
(45) Date of Patent: Jul. 23, 2019

(54) WIRE HARNESS AND MANUFACTURING METHOD THEREOF

(71) Applicant: YAZAKI CORPORATION, Tokyo (JP)

(72) Inventors: Yuto Ito, Tochigi (JP); Yoshio Shionome, Tochigi (JP); Takashi Oguri, Tochigi (JP); Jin Omori, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/165,309

(22) Filed: Oct. 19, 2018

(65) Prior Publication Data

US 2019/0123532 A1    Apr. 25, 2019

(30) Foreign Application Priority Data

Oct. 25, 2017   (JP) .................. 2017-206537

(51) Int. Cl.
  *B60R 16/02*   (2006.01)
  *H02G 3/04*    (2006.01)
  *H01B 7/00*    (2006.01)
  *H02G 1/00*    (2006.01)
  *H02G 3/30*    (2006.01)

(52) U.S. Cl.
  CPC ....... *H02G 3/0481* (2013.01); *B60R 16/0215* (2013.01); *H01B 7/0045* (2013.01); *H02G 1/00* (2013.01); *H02G 3/0406* (2013.01); *H02G 3/30* (2013.01)

(58) Field of Classification Search
  CPC ............ B60R 16/0207; B60R 16/0215; H02G 3/0481; H02G 1/00; H02G 3/0406; H02G 3/30; H01B 7/0045
  See application file for complete search history.

(56) References Cited

U.S. PATENT DOCUMENTS

| | | | |
|---|---|---|---|
| 2004/0099427 A1 | 5/2004 | Kihira | |
| 2005/0011687 A1* | 1/2005 | Yamaguchi | B60K 6/48 180/65.1 |
| 2006/0119137 A1* | 6/2006 | Coakley | B62D 21/15 296/187.03 |
| 2013/0248246 A1* | 9/2013 | Oga | B60R 16/0207 174/72 A |
| 2014/0374134 A1* | 12/2014 | Itani | B60R 16/0215 174/68.3 |
| 2015/0041171 A1* | 2/2015 | Heggdal | H01B 7/045 174/15.6 |

FOREIGN PATENT DOCUMENTS

JP   2004-171952 A   6/2004

* cited by examiner

*Primary Examiner* — Steven T Sawyer
(74) *Attorney, Agent, or Firm* — Kenealy Vaidya LLP

(57) ABSTRACT

There is provided a wire harness and a manufacturing method thereof. A wire harness routed in a vehicle body is provided with an electric wire and a metallic shield pipe in which the electric wire is inserted. The shield pipe has a rigidity that enables self-maintenance of an after-bent shape. The shield pipe is bent with the electric wire being inserted therein so as to form the shield pipe in a shape conforming to piping to be assembled to the vehicle body.

5 Claims, 6 Drawing Sheets

WIRE HARNESS AND MANUFACTURING METHOD THEREOF

CROSS-REFERENCES TO RELATED APPLICATIONS

This application is a based on and claims priority from Japanese Patent Applications No. 2017-206537 filed on Oct. 25, 2017, the entire contest of which are incorporated herein by reference.

BACKGROUND OF THE INVENTION

Technical Field

The present invention relates to a wire harness and manufacturing method thereof.

Background Art

Conventionally, a wire harness has been proposed that uses electric wires (so-called shield electric wires) provided with a shield function by a shield member having the function of shielding electromagnetic noise and the like in order to connect between various devices (a battery, an inverter, a motor, etc.) constituting an electric drive system of a hybrid car, an electric car and the like (for example, see Patent Document 1).

Patent Document 1: JP-A-2004-171952 A

SUMMARY OF THE INVENTION

The above-described wire harness is routed in a vehicle body by being fixed to a plurality of places of the vehicle body by brackets or the like with a plurality of electric wires being inserted in metal pipes. For this reason, routing in the vehicle body requires time, so that improvement in routing workability is desired.

The present invention is made in view of the above-mentioned circumstances, and an object thereof is to provide a wire harness excellent in routing workability and its manufacturing method.

To attain the above-mentioned object, a wire harness according to the present invention is characterized by the following (1) to (3):

(1) A wire harness routed in a vehicle body, provided with:
an electric wire; and
a metallic pipe in which the electric wire is inserted,
wherein the pipe has a rigidity that enables self-maintenance of an after-bent shape, and
the pipe is bent with the electric wire being inserted therein so that the pipe is formed in a shape conforming to a piping to be assembled to the vehicle body.

(2) The wire harness according to (1),
further provided with the piping,
wherein the pipe in which the electric wire is inserted is arranged along the piping, and the piping and the pipe are jointly fastened by a fixing member at an interval in a longitudinal direction of the pipe so as to be integrated.

(3) The wire harness according to (1) or (2),
further provided with a binding member having conductivity and fixing the pipe to a conductive portion of the vehicle body.

According to the wire harness of the structure of the above (1), the pipe can be easily integrated while being set along the piping assembled to the vehicle body. By assembling the piping to the vehicle body with the pipe being integrated therewith, routing in the vehicle body can be easily performed.

Moreover, since the pipe is bent and formed in a shape conforming to the piping and self-maintains the shape, it can be fixed to the piping with fewer fixing positions, so that the number of fixing members can be reduced to reduce cost and improve fixing workability.

Further, since the pipe has the high rigidity that enables self-maintenance of the after-bent-shape, the rigidity of the piping can be reduced, so that the cost of the piping can be suppressed.

Moreover, since the electric wire is covered with the metallic pipe, the shield function can be appropriately provided to the electric wire. Specifically, the electric wire can be protected from external impacts due to spattering pebbles or the like when the electric wire is routed under the floor of the vehicle while the electromagnetic noise released from the electric wire is shielded.

According to the wire harness of the structure of the above (2), since the pipe where the electric wire is inserted is fixed to the piping by the fixing member so as to be integrated, routing of the wire harness is completed simultaneously with the assembly of the piping to the vehicle body. Consequently, the routing workability of the wire harness can be significantly improved.

According to the structure of the above (3), by fixing the pipe to the conductive portion of the vehicle body by the binding member having conductivity, the electromagnetic noise shielded by the pipe can be released toward the conductive portion of the vehicle body by way of the binding member after passing through the pipe itself. Therefore, for example, it is unnecessary to provide a connector or the like with a dedicated mechanism for releasing the electromagnetic noise (a grounding mechanism/shell mechanism). Consequently, the number of parts of the wire harness can be reduced, so that cost can be reduced while the manufacture of the wire harness is facilitated.

Moreover, to attain the above-mentioned object, a wire harness manufacturing method according to the present invention is characterized by the following (4):

(4) A manufacturing method of a wire harness routed in a vehicle body, comprising:
bending a metallic pipe in which an electric wire is inserted so as to form the pipe into a shape conforming to a piping to be assembled to the vehicle body;
arranging the bent pipe along the piping before assembled to the vehicle body, and
jointly fastening the piping and the pipe by a fixing member at interval in a longitudinal direction of the pipe so as to be integrated.

According to the wire harness manufacturing method of the structure of the above (4), a wire harness can be obtained that is provided with the shield function by the electric wire being covered with the metallic pipe and can be easily routed in the vehicle.

According to the present invention, a wire harness excellent in routing workability and its manufacturing method can be provided.

The present invention has been briefly described. Further, details of the present invention will be further clarified by reading through the mode for carrying out the invention (hereinafter, referred to as "embodiment") described below with reference to the attached drawings.

BRIEF DESCRIPTION OF THE DRAWINGS

FIG. 1A is a schematic view of the vehicle of the present example viewed from a side, and FIG. 1B is a schematic view of the vehicle of the present example viewed from above.

FIG. 4A is a perspective view of a fixing position, and FIG. 4B is an A-A cross-sectional view of FIG. 4A.

FIGS. 5A to 5D are schematic perspective views of steps, respectively.

DETAILED DESCRIPTION OF THE EMBODIMENTS

Hereinafter, an example of an embodiment according to the present invention will be described with reference to the drawings.

Figure 1A:
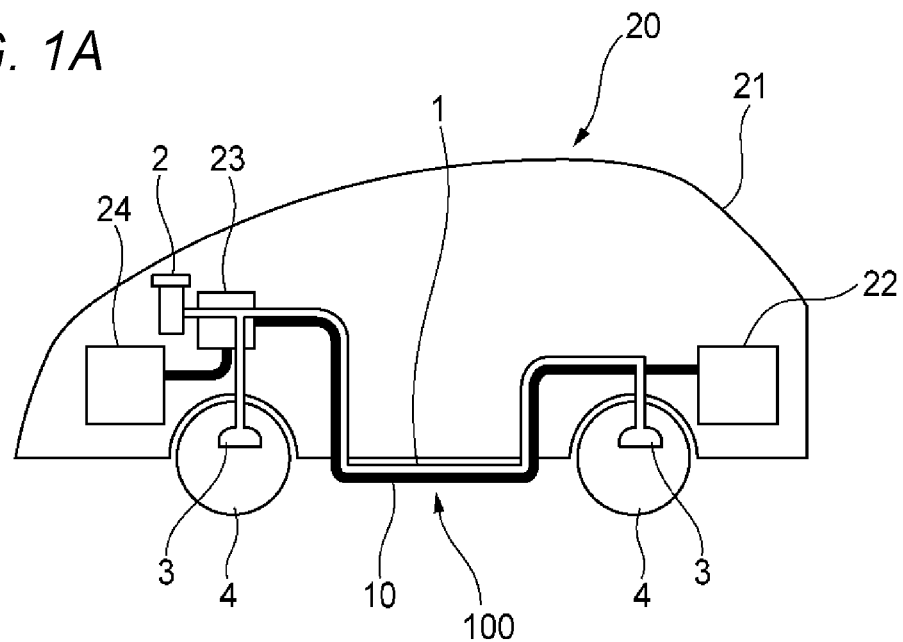
FIGS. 1A and 1B are schematic views showing an example where a wire harness is applied to a vehicle according to the embodiment of the present invention.
Figure 1B:
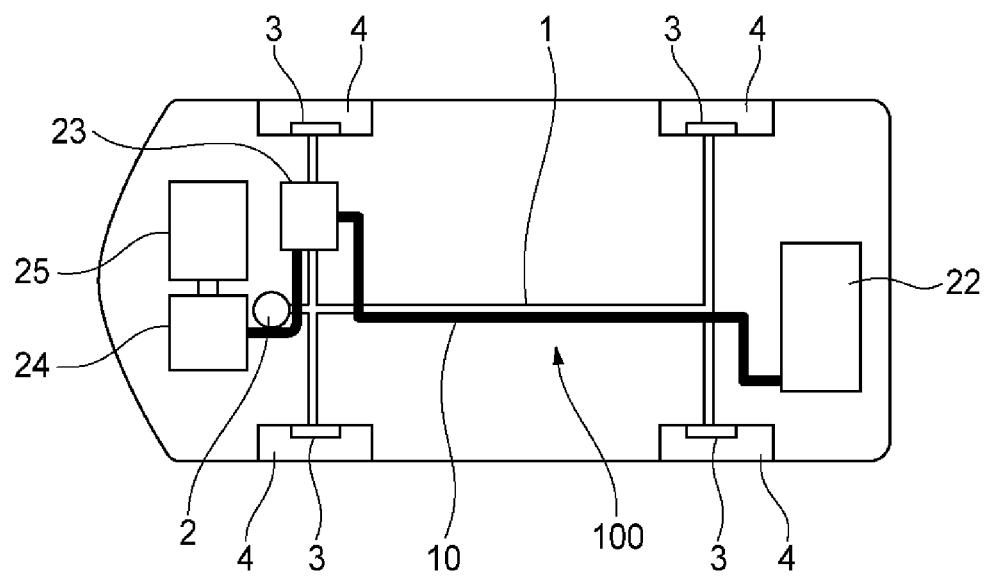

FIG. 1A and FIG. 1B show a condition where a wire harness (hereinafter, referred to as "wire harness 100") according to the embodiment of the present invention is routed in a hybrid vehicle 20. Hereinafter, the hybrid vehicle 20 will also be referred to as merely "vehicle 20".

The vehicle 20 is provided with, as shown in FIG. 1A and FIG. 1B, a battery 22 disposed in a rear part of a vehicle body 21, a power control unit 23 disposed in a front part of the vehicle body 21, a generator motor (MG) 24, and an internal combustion engine 25.

The battery 22 and the power control unit 23 are connected so that power can be provided and received by an electric wire (an electric wire 16 described later; see FIG. 3) inserted inside a shield pipe (pipe) 10. In other words, the battery 22 and the power control unit 23 are connected by an electric wire passed through the shield pipe 10.

The vehicle 20 has metallic brake piping (piping) 1 extending from a master cylinder 2. The brake piping 1 is assembled to the vehicle body 21 in the front-rear direction of the vehicle 20, and is connected to a caliper 3 of the disk brake provided on each wheel 4 of the vehicle 20. The brake piping 1 is filled with brake oil, and to each caliper 3, hydraulic pressure is applied by the brake oil by the driver operating the brake. Thereby, the wheels 4 are braked. The brake piping 1 is assembled to the vehicle body 21 so that an intermediate portion thereof passes under the floor of the vehicle body 21, and the shield pipe 10 is routed in the vehicle 20 while being integrated with this brake piping 1.

Figure 2:
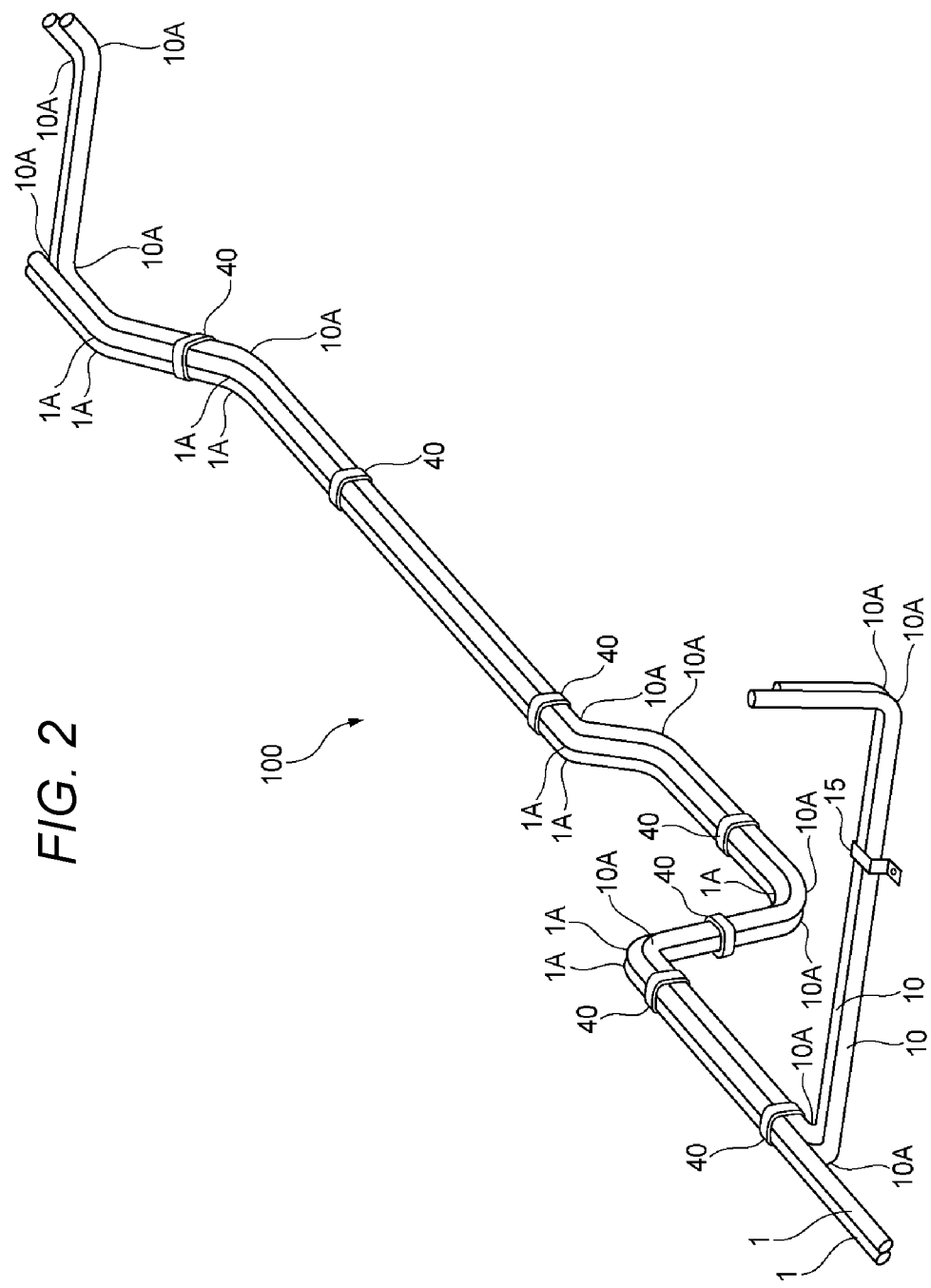
FIG. 2 is a perspective view of the wire harness according to the present embodiment.

FIG. 2 is a perspective view of the wire harness according to the present embodiment. As shown in FIG. 2, the wire harness 100 according to the present embodiment has two pipes of brake piping 1 through which brake oil is passed and two shield pipes 10 through each of which an electric wire is passed.

The two pipes of brake piping 1 and the two shield pipes 10 are each made parallel to each other. The brake piping 1 has a tridimensional shape having bent portions 1A at a plurality of positions in order that it is along the vehicle body 21. The shield pipes 10 each have a tridimensional shape having bent portions 10A at the same positions as the bent portions 1A of the brake piping 1. Thereby, the shield pipes 10 are formed in a shape conforming to the brake piping 1 having the tridimensional shape.

The brake piping 1 and the shield pipes 10 that are set along this brake piping 1 are jointly fastened by fixing members 40 such as a plurality of clamps or clips. The fixing members 40 are attached to a plurality of positions at intervals in the direction of the length of the brake piping 1 and the shield pipes 10. Thereby, the wire harness 100 is constituted by the brake piping 1 and the shield pipes 10 integrated by the fixing members 40.

Figure 3:
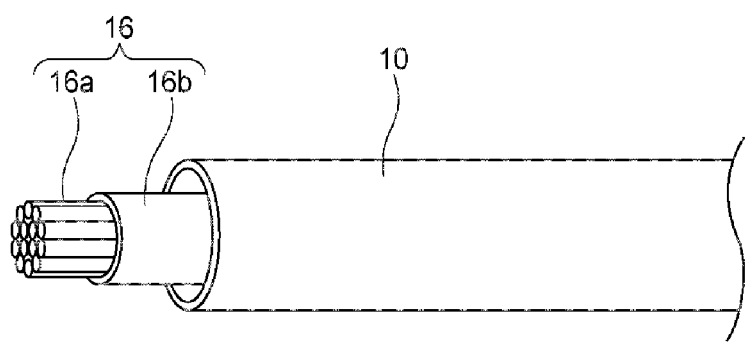
FIG. 3 is a schematic perspective view of an electric wire and a shield pipe used for the wire harness.
Figure 4A:
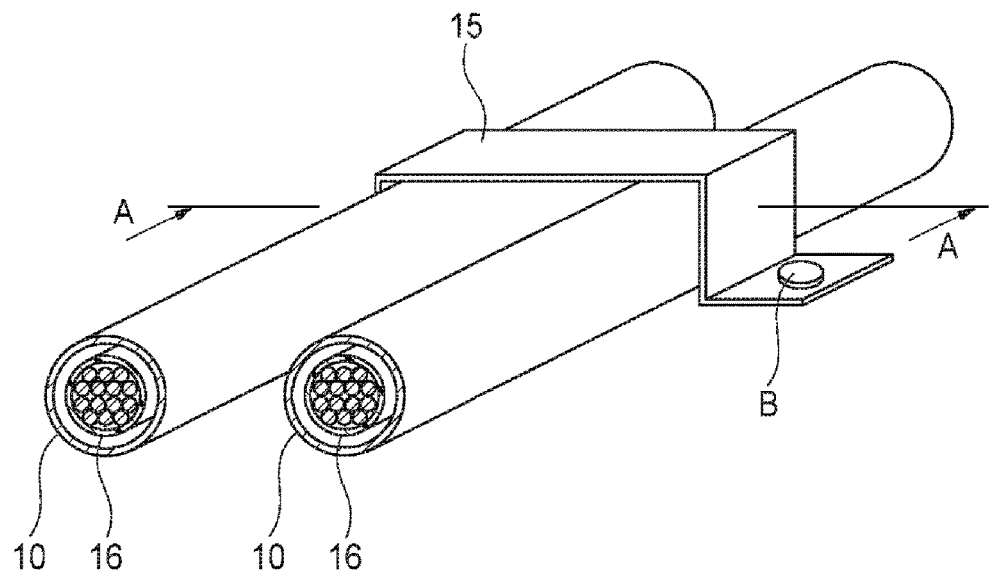
FIGS. 4A and 4B are views explaining a fixing structure of the wire harness by a binding member.
Figure 4B:
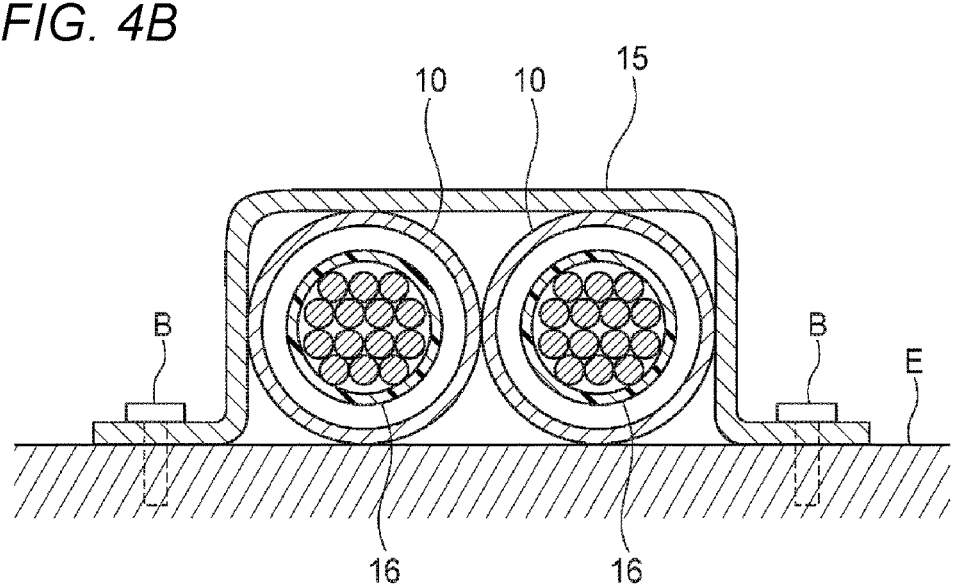

FIG. 3 is a schematic perspective view of the electric wire and the shield pipe used for the wire harness. FIGS. 4A and 4B are views explaining the fixing structure of the wire harness by a binding member; FIG. 4A is a perspective view of a fixing position and FIG. 4B is an A-A cross-sectional view of FIG. 4A.

As shown in FIG. 3, the shield pipe 10 is a metallic pipe having a pipe shape inside which the electric wire 16 can be inserted. The electric wire 16 is inserted inside (hollow portion) of the shield pipe 10. The electric wire 16 has a plurality of conductors 16a and an insulator 16b covering the conductors 16a. This shield pipe 10 has a rigidity that enables self-maintenance of the after-bent shape.

The metallic material forming the shield pipe 10 is not specifically limited, and aluminum, an aluminum alloy, a stainless steel or the like may be used. Weight reduction can be achieved by using aluminum or an aluminum alloy for the shield pipe 10. By using stainless steel for the shield pipe 10, the electromagnetic shielding effect can be enhanced due to the highness of permeability, and further, corrosion resistance can be enhanced.

As shown in FIG. 4A and FIG. 4B, inside (hollow portion) each of the two shield pipes 10, one electric wire 16 is inserted. In other words, the two shield pipes 10 are provided so as to correspond one-to-one with the two electric wires 16, respectively. By the electric wires 16 being inserted in the shield pipes 10 one for each as described above, the two electric wires 16 are isolated so as not to be in contact with each other. For this reason, heat interference between the electric wires 16 can be suppressed. The numbers of electric wires 16 and shield pipes 10 that the wire harness 100 has are not necessarily two; it may be three or more depending on the circuit configuration of the wire harness 100.

The two shield pipes 10 are fixed to an object to be grounded (conductive portion) E of the vehicle body 21 while being bundled by a binding member 15 having conductivity and provided in a predetermined position. The binding member 15 functions as a grounding member for releasing the electromagnetic noise shielded by the shield pipes 10 to the outside. Specifically, if the binding member 15 has a shape that abuts on both the shield pipes 10 and the object to be grounded E of the vehicle body 21, by fastening the binding member 15 together with the two shield pipes 10 to the object to be grounded E by bolts B, grounding (earthing) can be surely made while the two shield pipes 10 are bundled. Since the shield pipes 10 are wholly formed of a metal, grounding can be made not only in the position shown in FIG. 2 but in an arbitrary position.

Next, the manufacturing method of the wire harness 100 of the above-described structure will be described. FIGS. 5A to 5D are views explaining the manufacturing method of the wire harness according to the present embodiment, and FIGS. 5A to 5D are schematic perspective views of steps, respectively.

Figure 5A:
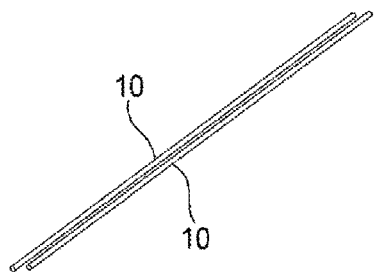
FIGS. 5A to 5D are views explaining a manufacturing method of the wire harness according to the present embodiment.

As shown in FIG. 5A, two straight shield pipes 10 where the electric wires 16 are inserted in advance are prepared.

Figure 5B:
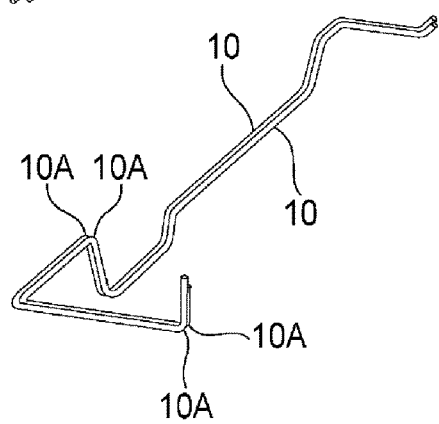

As shown in FIG. 5B, the two shield pipes 10 disposed parallel to each other are formed into a shape conforming to the brake piping 1 assembled to the vehicle 20. Specifically, the shield pipes 10 are bent at predetermined positions to form the bent portions 10A, thereby forming them into a tridimensional shape that can be set along the brake piping 1.

As a method of forming the shield pipes 10 having the bent portions 10A, for example, a mechanical forming method is usable in which straight metallic pipes are bent by a bender or the like. Moreover, the shield pipes 10 may be formed by a method in which a straight metallic pipe is fixed inside a die having a shape corresponding to the bent portions 10A and the bent portions 10A are formed by applying fluid pressure from the inside (hollow portion) of the pipe toward the die (so-called hydraulic forming method).

Figure 5C:
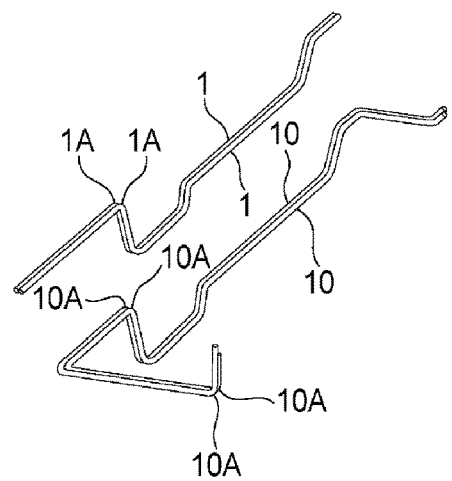
Figure 5D:
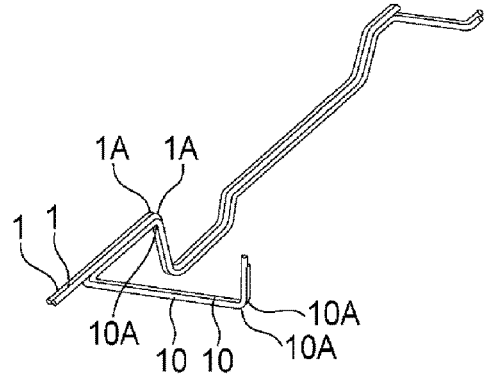

As shown in FIG. 5C, along the brake piping 1 previously formed in the tridimensional shape having the bent portions 1A, as shown in FIG. 5D, the shield pipes 10 formed in the tridimensional shape conforming to the brake piping 1 are set and positioned.

Then, the brake piping 1 and the shield pipes 10 are jointly fastened by a plurality of fixing members 40 so as to be integrated into the wire harness 100 formed of the brake piping 1 and the shield pipes 10 (see FIG. 2).

Figure 6:
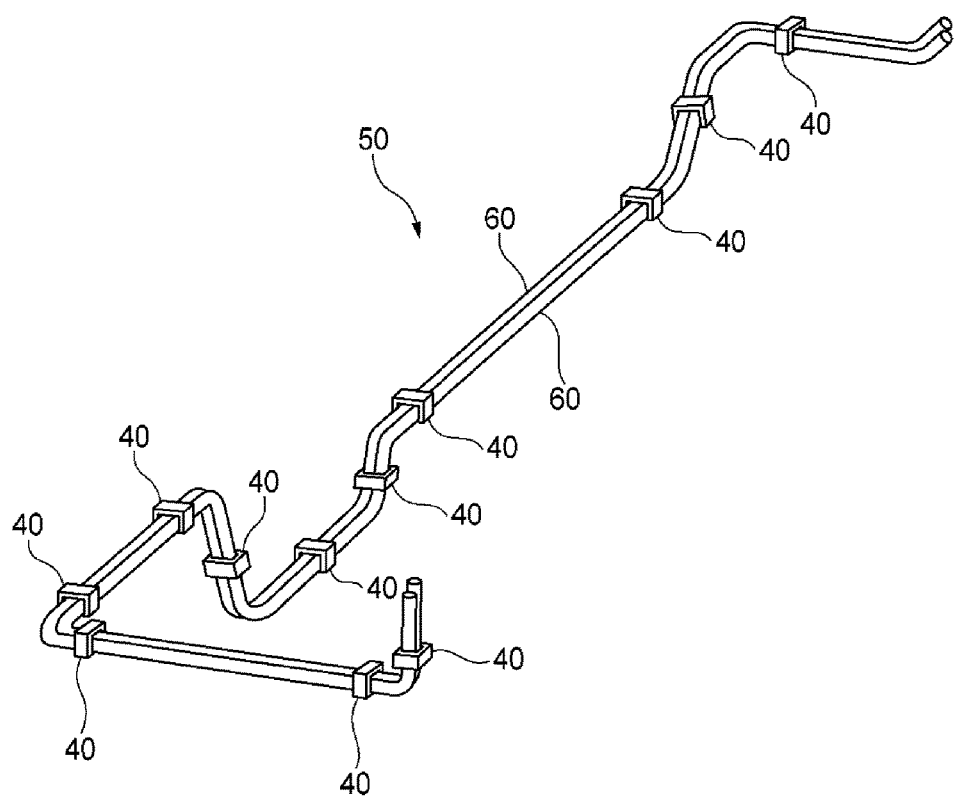
FIG. 6 is a perspective view of a wire harness according to a reference example.

Now, a wire harness according to a reference example will be described. FIG. 6 is a perspective view of the wire harness according to the reference example.

As shown in FIG. 6, in the wire harness 50 according to the reference example, the electric wires 16 are inserted in exterior members 60 formed of a synthetic resin such as polyamide (PA) or polypropylene (PP). In this wire harness 50, since the rigidity of the exterior members 60 is low, it is difficult to maintain the bent tridimensional shape. For this reason, in this wire harness 50, it is necessary to fix the neighborhood of each bent portion by the fixing member 40, so that cost is increased by the increase in the number of parts and further, fixing work requires time. Moreover, in the reference example, to provide the shield function, as the electric wires 16, for example, shield electric wires having braids covering the outer periphery are used, and further, grounding is secured by a connector or the like at the end portion.

According to the wire harness 100 of the present embodiment, since the shield pipes 10 having the rigidity that enables self-maintenance of the after-bent shape are bent with the electric wires 16 being inserted therein and are formed in a shape conforming to the brake piping 1 assembled to the vehicle body 21, they can be easily integrated along the brake piping 1. By adopting the structure integrated with the brake piping 1, routing of the wire harness 100 is completed simultaneously with the assembly of the brake piping 1 to the vehicle body 21. Consequently, the routing workability of the wire harness 100 can be significantly improved.

Further, since the shield pipes 10 are bent and formed in the shape conforming to the brake piping 1 and self-maintain the shape, they can be fixed to the brake piping 1 with fewer fixing positions, so that the number of fixing members 40 can be reduced to reduce cost and improve fixing workability.

Moreover, since the shield pipes 10 have the high rigidity that enables self-maintenance of the after-bent-shape, the rigidity of the brake piping 1 can be reduced, so that the cost of the brake piping 1 can be suppressed.

Further, since the electric wires 16 are covered with the metallic shield pipes 10, the shield function can be appropriately provided to the electric wires 16. Specifically, the electric wires 16 can be protected from external impacts due to spattering pebbles or the like when the electric wires 16 are routed under the floor of the vehicle 20 while the electromagnetic noise released from the electric wires 16 is shielded.

Moreover, by fixing the shield pipes 10 to the object to be grounded E formed of a conductive portion of the vehicle body 21 by the binding member 15 having conductivity, the electromagnetic noise shielded by the shield pipes 10 can be released toward the object to be grounded E of the vehicle body 21 by way of the binding member 15 after passing through the shield pipes 10 themselves. Therefore, for example, it is unnecessary to provide the connector or the like with a dedicated mechanism for releasing the electromagnetic noise (a grounding mechanism/shell mechanism). Consequently, the number of parts of the wire harness 100 can be reduced, so that cost can be reduced while the manufacture of the wire harness 100 is facilitated.

Moreover, according to the manufacturing method of the wire harness 100 of the present embodiment, the metallic shield pipes 10 where the electric wires 16 are inserted are bent and formed into the shape conforming to the brake piping 1 assembled to the vehicle body 21, the bent shield pipes 10 are set along the brake piping 1 before assembled to the vehicle body 21, and the brake piping 1 and the shield pipes 10 are jointly fastened by the fixing members 40 at intervals in the direction of the length so as to be integrated. Thereby, the electric wires 16 are covered with the metallic shield pipes 10 to provide the shield function, and further, the wire harness 100 that can be easily routed in the vehicle 20 can be obtained.

The present invention is not limited to the above-described embodiment, and modifications, improvements and the like are possible as appropriate. Besides, the materials, shapes, dimensions, numbers, disposition positions and the like of the elements of the above-described embodiment are arbitrary as long as the present invention is attained, and are not limited.

For example, the pipes along which the shield pipes 10 are set are not limited to the brake piping 1 but may be pipes that pass cooling water or the like.

Moreover, since the shield pipes 10 themselves have the high rigidity, the pipes along which the shield pipes 10 are set may be made of a resin with low rigidity instead of a metal.

Now, features of the above-described embodiment of the wire harness and its manufacturing method according to the present invention are briefly summarized and listed in the following [1] to [4]:

[1] A wire harness (100) routed in a vehicle body (21), including:
  an electric wire (16); and
  a metallic pipe (shield pipe 10) in which the electric wire (16) is inserted,
  wherein the pipe (shield pipe 10) has a rigidity that enables self-maintenance of an after-bent shape, and
  the pipe is bent with the electric wire (16) being inserted therein so that the pipe is formed in a shape conforming to a piping (brake piping 1) to be assembled to the vehicle body (21).

[2] The wire harness according to [1],
  further provided with the piping (brake piping 1),
  wherein the pipe (shield pipe 10) in which the electric wire (16) is inserted is set along the piping (brake piping 1), and the piping (brake piping 1) and the pipe (shield pipe 10) are jointly fastened by a fixing member (40) at an interval in a longitudinal direction of the pipe so as to be integrated.

[3] The wire harness according to [1] or [2], further provided with a binding member (15) having conductivity and fixing the pipe (shield pipe 10) to a conductive portion (object to be grounded E) of the vehicle body (21).

[4] A manufacturing method of a wire harness (100) routed in a vehicle body (21), bending a metallic pipe (shield pipe 10) in which an electric wire (16) is inserted so as to form the pipe into a shape conforming to a piping (brake piping 1) to be assembled to the vehicle body (21), arranging the bent pipe (shield pipe 10) along the piping (brake piping 1) before assembled to the vehicle body (21), and jointly fastening the piping (brake piping 1) and the pipe (shield pipe 10) by a fixing member (40) at interval in a longitudinal direction of the pipe so as to be integrated.

What is claimed is:

1. A wire harness routed in a vehicle body comprising:
   an electric wire; and
   a metallic pipe in which the electric wire is inserted,
   wherein the pipe has a rigidity that enables self-maintenance of an after-bent shape, the pipe is bent with the electric wire being inserted therein so that the pipe is formed in a shape conforming to a piping to be assembled to the vehicle body, and
   the piping is configured to be filled with a liquid to transmit a hydraulic pressure,
   the electric wire is electrically connected to a power control unit and a battery,
   the piping is connected to and in fluid communication with a master cylinder and a caliper, and the liquid transmits the hydraulic pressure from the master cylinder to the caliper.

2. The wire harness according to claim 1, further comprising the piping,
   wherein the pipe in which the electric wire is inserted is arranged along the piping, and the piping and the pipe are jointly fastened by a fixing member at an interval in a longitudinal direction of the pipe so as to be integrated.

3. The wire harness according to claim 1, further comprising a binding member having conductivity and fixing the pipe to a conductive portion of the vehicle body.

4. A manufacturing method of a wire harness routed in a vehicle body, comprising:
   bending a metallic pipe, in which an electric wire is inserted, by a bender or by applying fluid pressure from an inside of the pipe toward a die after the pipe is fixed inside the die having a predetermined shape so as to form the pipe into a shape conforming to a piping to be assembled to the vehicle body, the piping is configured to be filled with a liquid to transmit hydraulic pressure; arranging the bent pipe along the piping before assembled to the vehicle body, and jointly fastening the piping and the pipe by a fixing member at interval in a longitudinal direction of the pipe so as to be integrated;
   electrically connecting the electric wire to a power control unit and a battery; connecting the piping to a master cylinder and a caliper such that the piping is in fluid communication with a master cylinder and a caliper, and the liquid transmits the hydraulic pressure from the master cylinder to the caliper.

5. The wire harness according to claim 3, wherein the binding member is spaced away from the piping.

\* \* \* \* \*